US012125445B2

(12) United States Patent
Park et al.

(10) Patent No.: US 12,125,445 B2
(45) Date of Patent: *Oct. 22, 2024

(54) DISPLAY DEVICE

(71) Applicant: SAMSUNG DISPLAY CO., LTD., Yongin-si (KR)

(72) Inventors: Jung Kook Park, Yongin-si (KR); Dong Wan Park, Yongin-si (KR); Do Hyun Kang, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,074

(22) Filed: Jun. 9, 2023

(65) Prior Publication Data

US 2023/0326416 A1 Oct. 12, 2023

Related U.S. Application Data

(63) Continuation of application No. 17/465,628, filed on Sep. 2, 2021, now Pat. No. 11,710,460.

(30) Foreign Application Priority Data

Sep. 2, 2021 (KR) ........................ 10-2020-0111881

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2320/0626* (2013.01)

(58) Field of Classification Search
CPC ............... G09G 3/3291; G09G 3/3266; G09G 2320/0626
See application file for complete search history.

(56) References Cited

U.S. PATENT DOCUMENTS

| | | | | |
|---|---|---|---|---|
| 6,597,333 | B2 | 7/2003 | Todoroki et al. | |
| 8,330,684 | B2 | 12/2012 | Park et al. | |
| 9,269,294 | B2 | 9/2016 | Eom et al. | |
| 11,710,460 | B2 * | 7/2023 | Park | G09G 3/3233 345/204 |
| 2015/0097764 | A1 | 4/2015 | Pyo et al. | |
| 2015/0138251 | A1 | 5/2015 | Pyo | |
| 2016/0329019 | A1 * | 11/2016 | An | G09G 3/20 |
| 2018/0151132 | A1 | 5/2018 | Lee et al. | |
| 2022/0051620 | A1 * | 2/2022 | Song | G09G 3/3233 |

FOREIGN PATENT DOCUMENTS

| | | |
|---|---|---|
| JP | 2000010522 | 1/2000 |
| KR | 100857672 | 9/2008 |
| KR | 102032358 | 10/2019 |

* cited by examiner

*Primary Examiner* — Kenneth B Lee, Jr.
(74) *Attorney, Agent, or Firm* — CANTOR COLBURN LLP

(57) ABSTRACT

A display device includes at least a first luminance range and a second luminance range which includes a luminance different from the first luminance range. In a boundary area of a second dimming range corresponding to the second luminance range and which is adjacent to a first dimming range corresponding to the first luminance range, a reference luminance emitted from a pixel is maintained as a first constant luminance value, and an off-duty number, which is the number of periods in which the pixel is turned off during one frame, is gradually increased by an emission control signal.

21 Claims, 14 Drawing Sheets

DISPLAY DEVICE

This application is a continuation of U.S. patent application Ser. No. 17/465,628, filed on Sep. 2, 2021, which claims priority to Korean Patent Application No. 10-2020-0111881 filed Sep. 2, 2020, and all the benefits accruing therefrom under 35 U.S.C. § 119, the content of which in its entirety is herein incorporated by reference.

TECHNICAL FIELD

The disclosure relates to a display device.

DISCUSSION OF THE RELATED ART

As an information technology is developed, importance of a display device that is a connection medium between a user and information is emphasized. In response to this, use of display devices such as a liquid crystal display device and an organic light emitting display device is increasing.

Among the display devices, an organic light emitting display device displays an image using an organic light emitting diode that generates light by recombination of an electron and a hole. Such an organic light emitting display device has an advantage that the organic light emitting display device has a fast response speed and the organic light emitting display device is driven with low power consumption.

However, compared to a liquid crystal display device that may control an overall luminance by controlling an amount light incident on a liquid crystal display panel by adjusting a magnitude of a voltage applied to a back light unit, the organic light emitting display device is a display device using light emission of an organic light emitting layer. Therefore, implementing dimming of controlling the overall luminance in the organic light emitting display device is difficult.

Accordingly, the organic light emitting display device implements dimming of a display panel through a smart dimming method that sets a lower luminance level using an arithmetic expression by a gamma curve for a luminance for grayscale based on a maximum luminance, an AMOLED impulsive driving ("AID") method that performs dimming by adjusting on/off-duty of an emission control signal by applying an impulse driving method, and/or the like.

SUMMARY

Human vision tends to better recognize a change in a low luminance area than in a high luminance area. During dimming of the organic light emitting display device, when the AID method is applied to the low luminance area, a problem that a flicker phenomenon is visible when the number of cycles (that is, the off-duty number of the emission control signal included in one frame) of the AID is low may occur.

An aspect to be solved by the disclosure is to provide a display device capable of reducing a flicker phenomenon when an AID method is applied in a low luminance area.

However, the aspect of the disclosure according to the invention is not limited to the above-described aspects, and may be variously expanded without departing from the spirit and scope of the disclosure.

According to an embodiment of the disclosure for solving the above-described aspect, a display device includes at least a first luminance range and a second luminance range which includes a luminance different from the first luminance range. In a boundary area of a second dimming range corresponding to the second luminance range and which is adjacent to a first dimming range corresponding to the first luminance range, a reference luminance emitted from a pixel is maintained as a first constant luminance value, and an off-duty number, which is the number of periods in which the pixel is turned off during one frame, is gradually increased by an emission control signal.

The off-duty number may be the number of pulses of the emission control signal included in one frame.

The off-duty number may increase by twice per frame in the boundary area.

The off-duty number may be 1 at a start point of the boundary area and 32 at an end point of the boundary area.

An off-duty ratio of the emission control signal may be maintained at a constant value in the boundary area.

In the boundary area, when a change in the off-duty number is eight or more, a section in which the off-duty ratio gradually increases may be included.

The off-duty ratio may increase in an order of about 2 percentages (%), about 5%, about 10%, and about 15% when the off-duty number is 16.

In the boundary area, when a change in the off-duty number is eight or more, a section in which the off-duty number has an intermediate number may be further included between a section in which the change of eight or more occurs such that the off-duty number is changed less than eight at a time.

The off-duty number may increase by 1 at a time in a section in which the off-duty number increases from 16 to 32.

The off-duty number may be 1 per one frame in the first dimming range, and 32 per one frame in the second dimming range except for the boundary area.

In the second dimming range except for the boundary area, the reference luminance may be maintained as the first constant luminance value, and the off-duty ratio may be gradually increased.

The first constant luminance value may be in a range of about 90 to about 120 Candela per square metre (cd/m$^2$).

The first luminance range may include a luminance higher than a luminance included in the second luminance range.

A dimming luminance including the first luminance range and the second luminance range may non-linearly decrease from the first dimming range to the second dimming range.

The first luminance range may be an area corresponding to about 350 nits to about 100 nits, and the second luminance range may be an area corresponding to about 100 nits to about 2 nits.

In the first luminance range, the reference luminance may non-linearly decrease to correspond to the dimming luminance, and the off-duty ratio may maintain a constant value.

The first luminance range may include an ultra-high luminance range corresponding to about 350 nits to about 265 nits, a high luminance range corresponding to about 265 nits to about 162 nits, and a medium luminance range corresponding to about 162 nits to about 100 nits.

In the ultra-high luminance range, the reference luminance may non-linearly decrease to correspond to the dimming luminance, and the off-duty ratio may be maintained as a first off-duty ratio.

In the high luminance range, the reference luminance may be maintained as a second constant luminance value, and the off-duty ratio may be gradually increased.

The second constant luminance value may be greater than the first constant luminance value.

The display device according to embodiments of the disclosure may reduce a flicker phenomenon by gradually increasing the number of AID cycles in a boundary area in which a luminance changes to a low luminance.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
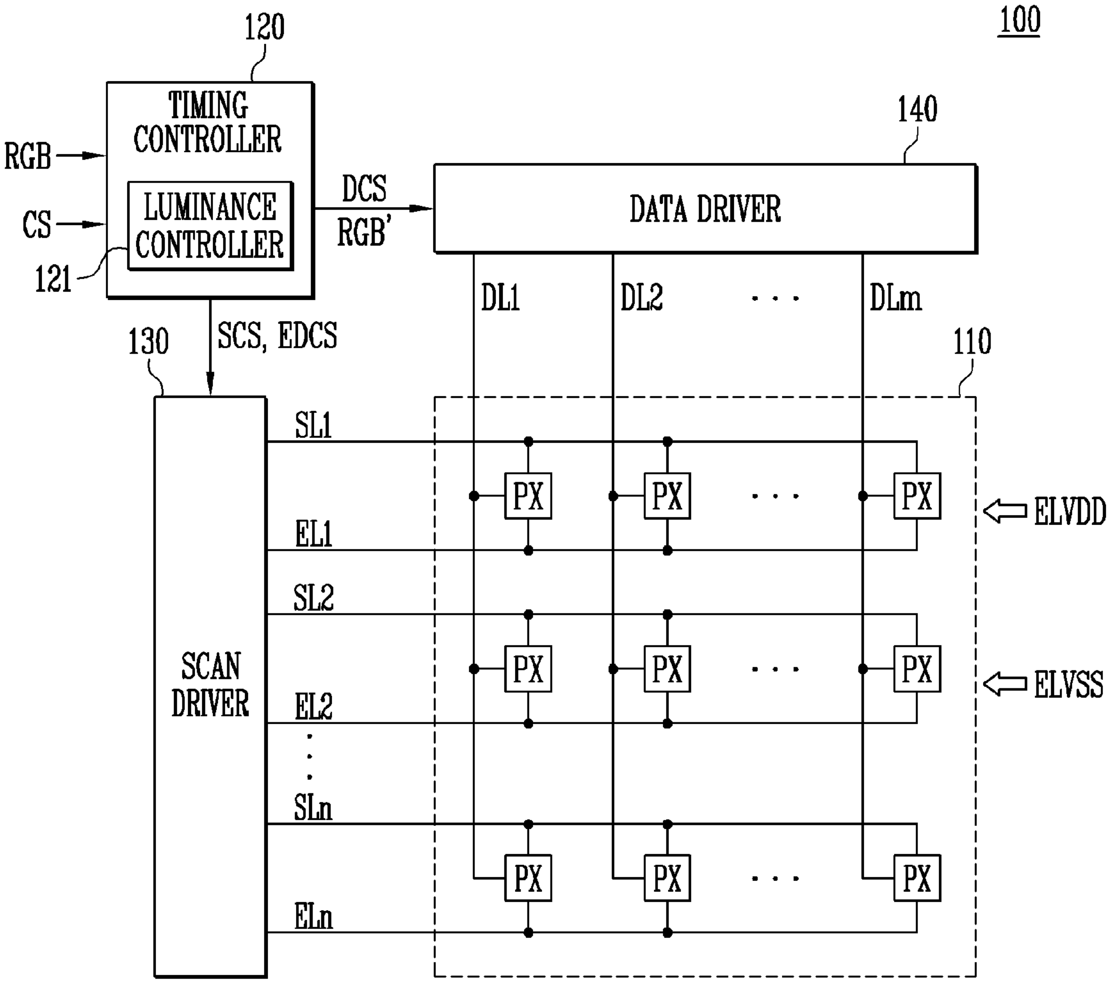
FIG. 1 is a diagram schematically illustrating an organic light emitting display device according to an embodiment of the disclosure.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value. Hereinafter, a preferred embodiment of the disclosure will be described in more detail with reference to the accompanying drawings. The same reference numerals are used for the same components in the drawings, and repetitive description for the same components will be omitted.

FIG. 1 is a diagram schematically illustrating an organic light emitting display device according to an embodiment of the disclosure.

Referring to FIG. 1, the organic light emitting display device 100 according to an embodiment of the disclosure may include a pixel unit 110, a timing controller 120, a scan driver 130, and a data driver 140. Each of the timing controller 120, the scan driver 130, and the data driver 140 may be disposed on separate semiconductor chips, or the timing controller 120, the scan driver 130, and the data driver 140 may be integrated into one semiconductor chip. In addition, the scan driver 130 may be disposed on the same substrate as the pixel unit 110.

The pixel unit 110 (e.g., display panel) may include a plurality of pixels PX arranged in a matrix manner at an intersection of scan lines SL1 to SLn arranged in a row and data lines DL1 to DLm arranged in a column. The pixels PX may receive a scan signal and a data signal from the scan lines SL1 to SLn and the data lines DL1 to DLn, respectively. In addition, each of the pixels PX may receive emission control signals from emission control signal lines EL1 to ELm. The pixels PX may display an image by emitting light in correspondence with the scan signal, the data signal, the emission control signal, and power voltages ELVDD and ELVSS. An emission time of the pixels PX may be adjusted in response to the emission control signal.

The scan driver 130 may receive a scan control signal SCS and an emission duty control signal EDCS from the timing controller 120 to generate the scan signal and the emission control signal. At this time, an off-duty number and an off-duty ratio of the emission control signal may be adjusted in response to the emission duty control signal EDCS. The off-duty number of the emission control signal may be defined as the number of periods in which the pixel PX is turned off by the emission control signal included in one frame, and the off-duty ratio of the emission control signal may be defined as ratio of a period (e.g., P1 in FIG. 3) in which the pixel is turned off by the emission control signal to one period 1F (See FIG. 3) including the period P1 and a period (e.g., P2 in FIG. 3) in which the pixel is turned on. In other words, the off-duty number of the emission control signal may be defined as the number of pulses of the emission control signal included in one frame, and the off-duty ratio of the emission control signal may be defined as a width of each pulse of the emission control signal.

The scan driver 130 may supply the generated scan signal and emission control signal to the pixels PX through the scan lines SL1 to SLn and the emission control signal lines EL1 to ELn, respectively. The data signal may be provided by sequentially selecting the pixels PX of each row according to the scan signal. In addition, the emission time of the pixels PX may be adjusted according to the emission control signal. In the present embodiment, the scan signal and the emission control signal are generated by the same scan driver 130, but the invention is not limited thereto. Although not shown in the drawing, the display device 100 may further include a separate emission control driver, and the emission control signal may be generated by the emission control driver.

The data driver 140 may receive a data control signal DCS and image data RGB' from the timing controller 120, and may supply a data signal corresponding to the image data RGB' to the pixels PX through the data lines DL1 to DLm in response to the data control signal DCS. The data driver 140 may convert the received image data RGB' into the data signal of a voltage or current form.

The timing controller 120 may generates the signals SCS, EDCS, and DCS for controlling the scan driver 130 and the data driver 140 based on image data RGB and a control signal CS transmitted from the outside, and may provide the signals SCS, EDCS, and DCS to the scan driver 130 and the data driver 140. The control signal CS may be, for example, timing signals such as a vertical synchronization signal, a horizontal synchronization signal, a clock signal, and a data enable signal, or a signal for setting a dimming mode. In addition, the timing controller 120 may convert the image data RGB received from the outside to generate the image data RGB' so that the image data RGB' fits a format (resolution, pixel disposition structure, and the like) of the pixel unit 110, and may provide the image data RGB' to the data driver 140. The timing controller 120 may include a luminance controller 121. The luminance controller 121 may convert a grayscale of the image data RGB' or adjust a duty number and/or a duty ratio of the emission control signal according to a predetermined dimming mode. In this case, an emission luminance of the pixel unit 110 may be adjusted in correspondence with dimming.

Hereinafter, a method for adjusting a luminance through a smart dimming method to correspond to a set dimming mode (FIG. 2) and an AMOLED impulse driving ("AID") method for controlling the luminance by controlling the duty ratio of the emission control signal (FIG. 3) are described in detail with reference to FIGS. 2 and 3.

Figure 2:
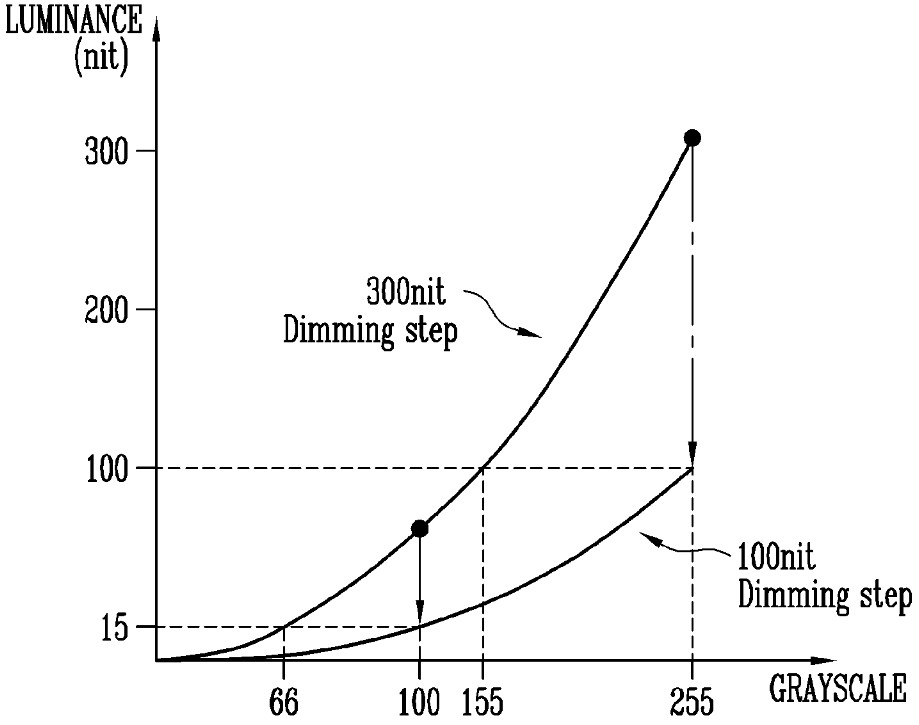
FIG. 2 is a diagram illustrating a smart dimming method through image data conversion.

FIG. 2 is a diagram illustrating the smart dimming method through image data conversion.

The smart dimming method is a method for adjusting a luminance by converting grayscale value of the image data RGB'. For example, the smart dimming method is a method for changing a grayscale value (that is, a bit value) of the image data RGB' corresponding to the highest luminance level according to a dimming level (that is, a dimming step).

FIG. 2 illustrates a process of changing from a first dimming level (e.g., a 300 nit-dimming step) in which the highest luminance is 300 nits to a second dimming level (e.g., a 100 nit-dimming step) in which the highest luminance is 100 nits. At the first dimming level, 255 grayscales are set to implement the luminance of 300 nits (i.e., 0 to 254 grayscales are set to express a luminance of 300 nits or less). Here, the nit is a non-SI unit which corresponds to Candela per square metre ($cd/m^2$). That is 1 nit amounts to 1 $cd/m^2$.

At the second dimming level, 255 grayscales are set to implement the luminance of 100 nits. That is, at the second dimming level, when the image data RGB' indicates 255 grayscales, a grayscale luminance at 255 grayscales is required to be 100 nits. At the first dimming level, a reference grayscale corresponding to the 100 nits luminance is 155 grayscales. Therefore, the image data RGB' indicating 255 grayscales at the second dimming level may be converted into the image data RGB' indicating 155 grayscales at the first dimming level. For example, when the image data RGB' is a digital signal of 8 bits, a digital signal '11111111' indicating 255 grayscales at the second dimming level may be converted into '10011011' indicating 155 grayscales at the first dimming level.

In addition, at the second dimming level, when the image data RGB' indicates 100 grayscales, the grayscale luminance at 100 grayscales is required to be 15 nits. At the first dimming level, the reference grayscale corresponding to the 15 nits luminance is 66 grayscales. Therefore, the image data RGB' indicating 100 grayscales at the second dimming level may be converted into the image RGB' data indicating 66 grayscales at the first dimming level.

Figure 3:
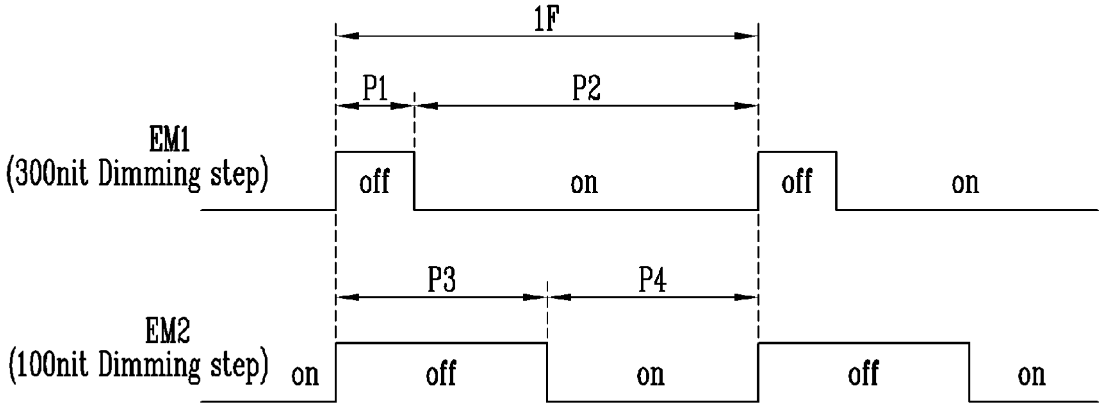
FIG. 3 is a diagram illustrating an AMOLED impulsive driving ("AID") method by adjusting an off-duty ratio of an emission control signal.

FIG. 3 is a diagram illustrating the AID method by adjusting the off-duty ratio of the emission control signal. In FIG. 3, when emission control signals EM1 and EM2 are logic high, a non-emission state (i.e., "off" state) is designated, and when the emission control signals EM1 and EM2 are logic low, an emission state (i.e., "on" state) is designated, but the disclosure according to the invention is not limited thereto.

The AID method is a method for adjusting the luminance by controlling the duty ratio of the emission control signal to correspond to the set dimming step. The AID method changes the luminance by varying an on-period and an off-period during one period 1F of the emission control signal that controls emission and non-emission states of the pixel PX. That is, the AID method may adjust the luminance by controlling the off-duty ratio ("AOR") of the emission control signal, and may set the AOR of the emission control signal of 0 percentages (%), 20%, 40%, 60%, 80%, or 95%. However, these are examples, and various duty ratios may be set according to a user.

Referring to FIG. 3, an on-period P4 of the emission control signal EM2 at the 100 nits dimming step is less than an on-period P2 of the emission control signal EM1 at the 300 nit-dimming step. Conversely, an off-period P3 of the emission control signal EM2 at the 100 nit-dimming step is longer than an off-period P1 at the 300 nit-dimming step. Since the pixels emit light during the on-period of the emission control signal and the pixels do not emit light during the off-period, as the on-period of the emission control signal decreases and the off-period of the emission control signal increases, the luminance of the one period 1F may decrease. At this time, the AOR of the emission control signals EM1 and EM2 for each luminance level may be set in consideration of a unique characteristic of the pixel unit 110.

Figure 4:
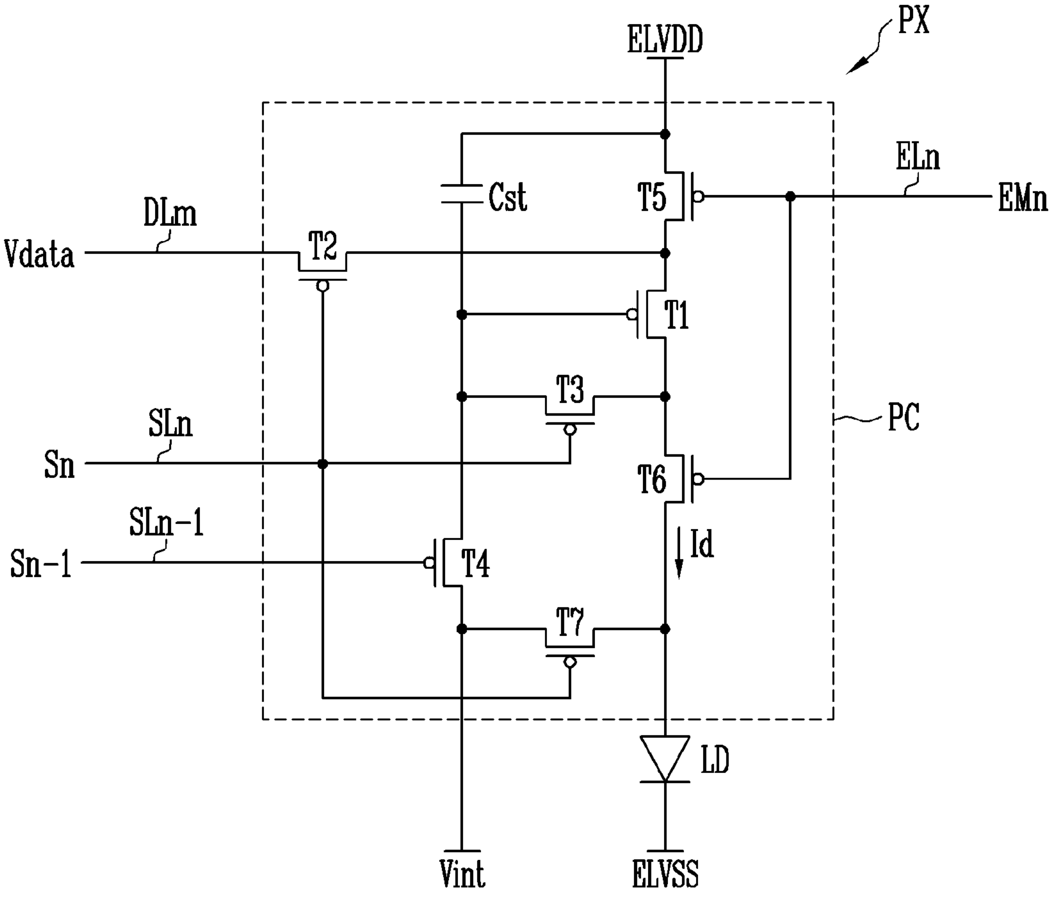
FIG. 4 is a circuit diagram illustrating a pixel shown in FIG. 1 as an example.
Figure 5:
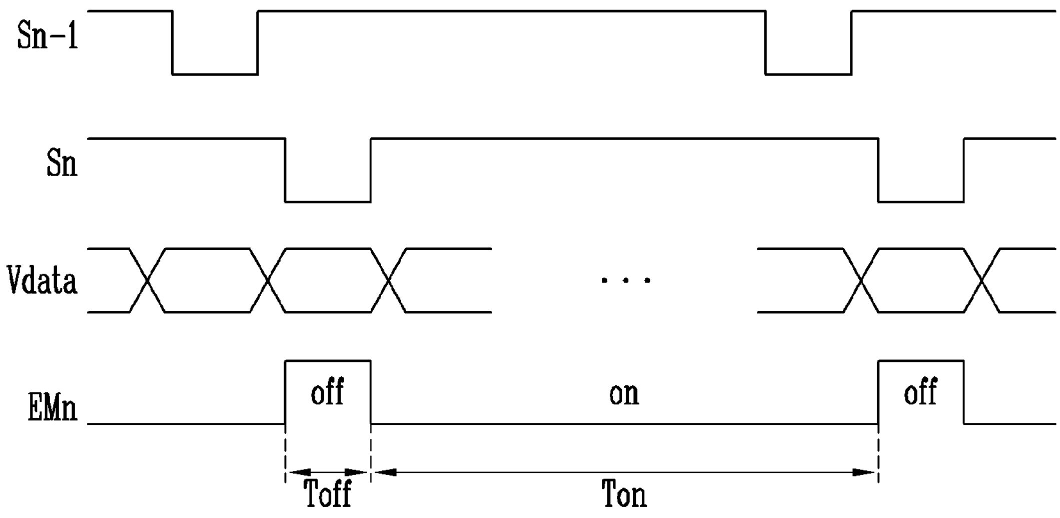
FIG. 5 is an embodiment of a driving waveform diagram of the pixel PX shown in FIG. 4.

FIG. 4 is a circuit diagram illustrating the pixel shown in FIG. 1 as an example, and FIG. 5 is an embodiment of a driving waveform diagram of the pixel PX shown in FIG. 4.

Referring to FIG. 4, the pixel PX may include a pixel circuit PC configured of transistors T1 to T7 and a capacitor Cst and a light emitting element LD.

The first to seventh transistors T1 to T7 may be thin film transistors ("TFTs"), and the first to seventh transistors T1 to T7 are P-type transistors as an example. However, the first to seventh transistors T1 to T7 may be configured as N-type transistors and may be driven by inverting the driving waveform of FIG. 5 in another embodiment. In addition, in the present embodiment, the pixel circuit PC includes the seven first to seventh transistors T1 to T7 and one capacitor Cst, but the invention is not limited thereto. The number of transistors and capacitors configuring the pixel circuit PC may be variously changed.

A first electrode of the capacitor Cst may be connected to a first power voltage ELVDD, and another electrode of the capacitor Cst may be connected to a gate electrode of the first transistor T1.

A first electrode of the first transistor T1 may be connected to a second electrode of the fifth transistor T5, a second electrode of the first transistor T1 may be connected to a first electrode of the sixth transistor T6, and a gate electrode of the first transistor T1 may be connected to a second electrode of the capacitor Cst. The first transistor T1 may be referred to as a driving transistor.

A first electrode of the second transistor T2 may be connected to the data line DLm to receive a data signal Vdata, a second electrode of the second transistor T2 may be connected to the first electrode of the first transistor T1, and a gate electrode of the second transistor T2 may be connected to the scan line SLn. The second transistor T2 may be referred to as a switching transistor, a scan transistor, a scanning transistor, or the like.

A second electrode of the third transistor T3 may be connected to the second electrode of the first transistor T1, a first electrode of the third transistor T3 may be connected to the gate electrode of the first transistor T1, and a gate electrode of the third transistor T3 may be connected to the scan line SLn.

A first electrode of the fourth transistor T4 may be connected to the gate electrode of the first transistor T1, a second electrode of the fourth transistor T4 may be connected to a line for supplying an initialization voltage Vint, and a gate electrode of the fourth transistor T4 may be connected to a previous scan line SLn-1.

A first electrode of the fifth transistor T5 may be connected to a line for supplying the first power voltage ELVDD, the second electrode of the fifth transistor T5 may be connected to the first electrode of the first transistor T1, and a gate electrode of the fifth transistor T5 may be connected to the emission control signal line ELn which supplies an emission control signal EMn.

The first electrode of the sixth transistor T6 may be connected to the second electrode of the first transistor T1, a second electrode of the sixth transistor T6 may be connected to an anode electrode of the light emitting element LD, and a gate electrode of the sixth transistor T6 may be connected to the emission control signal line ELn. The transistors T5 and T6 may be referred to as light emitting transistors.

A second electrode of the seventh transistor T7 may be connected to the anode electrode of the light emitting element LD, a first electrode of the seventh transistor T7 may be connected to the line for supplying the initialization voltage Vint, and a gate electrode of the seventh transistor T7 may be connected to a current scan line Si. In another embodiment (not shown), the gate electrode of the seventh transistor T7 may be connected to another scan line. For example, the gate electrode of the seventh transistor T7 may be connected to the previous scan line SLn-1, a scan line previous to the scan line SLn-1, or a next scan line ((n+1)-th scan line). When a scan signal of a turn-on level is applied to the current scan line Sn, the seventh transistor T7 transfers the initialization voltage Vint to the anode electrode of the light emitting element LD, to initialize an amount of charge accumulated in the light emitting element LD.

The anode electrode of the light emitting element LD may be connected to the second electrode of the sixth transistor T6, and a cathode electrode of the light emitting element LD may be connected to a line for supplying a second power voltage ELVSS. The light emitting element LD may emit light by itself by receiving a driving current Id through the pixel circuit PC. The light emitting element LD may be configured of an organic light emitting diode, or an inorganic light emitting diode such as a micro light emitting diode ("LED"), or a quantum dot light emitting diode. In addition, the light emitting element LD may be a light emitting element configured of organic and inorganic materials in combination. In FIG. 4, the pixel PX includes a single light emitting element LD, but in another embodiment, the pixel PX may include a plurality of light emitting elements, and the plurality of light emitting elements LD may be connected to each other in series, in parallel, or in series and parallel.

Referring to FIG. 5, according to an embodiment of the disclosure, a previous scan signal Sn-1 of a logic low level is supplied through the previous scan line SLn-1 during an initialization period. The fourth transistor T4 may be turned on in response to the previous scan signal Sn-1 of the logic low level, and the initialization voltage Vint is supplied to the first transistor T1 through the fourth transistor T4, and the first transistor T1 may be initialized by the initialization voltage Vint.

Thereafter, during a data programming period, the scan signal Sn of a logic low level may be supplied through the scan line SLn. Then, the second transistor T2, the third transistor T3, and the seventh transistor T7 are turned on in response to the scan signal Sn of the logic low level.

At this time, the first transistor T1 is diode-connected by the turned-on third transistor T3 and is biased in a forward direction (i.e., direction from the gate electrode to the second electrode of the first transistor T1).

Then, a compensation voltage (Vdata+Vth) which amounts to a voltage value reduced by a threshold voltage (Vth, here, Vth has a negative value) of the first transistor T1 from a data signal Vdata supplied from the data line DLm is applied to the gate electrode of the first transistor T1.

The first power voltage ELVDD and the compensation voltage (Vdata+Vth) are applied to opposite ends of the capacitor Cst, respectively, and a charge corresponding to a voltage difference between the opposite ends is stored in the capacitor Cst. Thereafter, during an emission period Ton, an emission control signal EMn supplied from the emission control signal lines EL1 to ELn is changed from a high level to a low level. Then, during the emission period Ton, the fifth transistor T5 and the sixth transistor T6 are turned on by the emission control signal EMn of the low level.

Then, a driving current Id depending on a voltage difference between a voltage of the gate electrode of the first transistor T1 and the first power voltage ELVDD is generated, and the driving current Id is supplied to the light emitting element LD through the sixth transistor T6.

During the emission period Ton, a gate-source voltage (i.e., voltage between the gate and first electrodes) of the first transistor T1 is maintained as {(Vdata+Vth)−ELVDD} by the capacitor Cst, and according to a current-voltage relationship of the first transistor T1, the driving current Id may be proportional to a square of a value obtained by subtracting the threshold voltage Vth from the gate-source voltage, which amounts to $\{(Vdata-ELVDD)^2\}$. That is, the emission luminance of the light emitting element LD may be controlled according to the data signal Vdata.

In addition, the emission luminance may be controlled according to the AOR of a non-emission period Toff of the light emitting element LD by the emission control signal EMn. Even though the same data signal Vdata is applied, the emission luminance of the light emitting element LD is decreased as the AOR of the non-emission period Toff for a display period of one period, which includes the emission period Ton and the non-emission period Toff, for example, one frame is increased. Therefore, the emission luminance of the light emitting element LD may be controlled according to the data signal Vdata and the emission control signal EMn.

Figure 6:
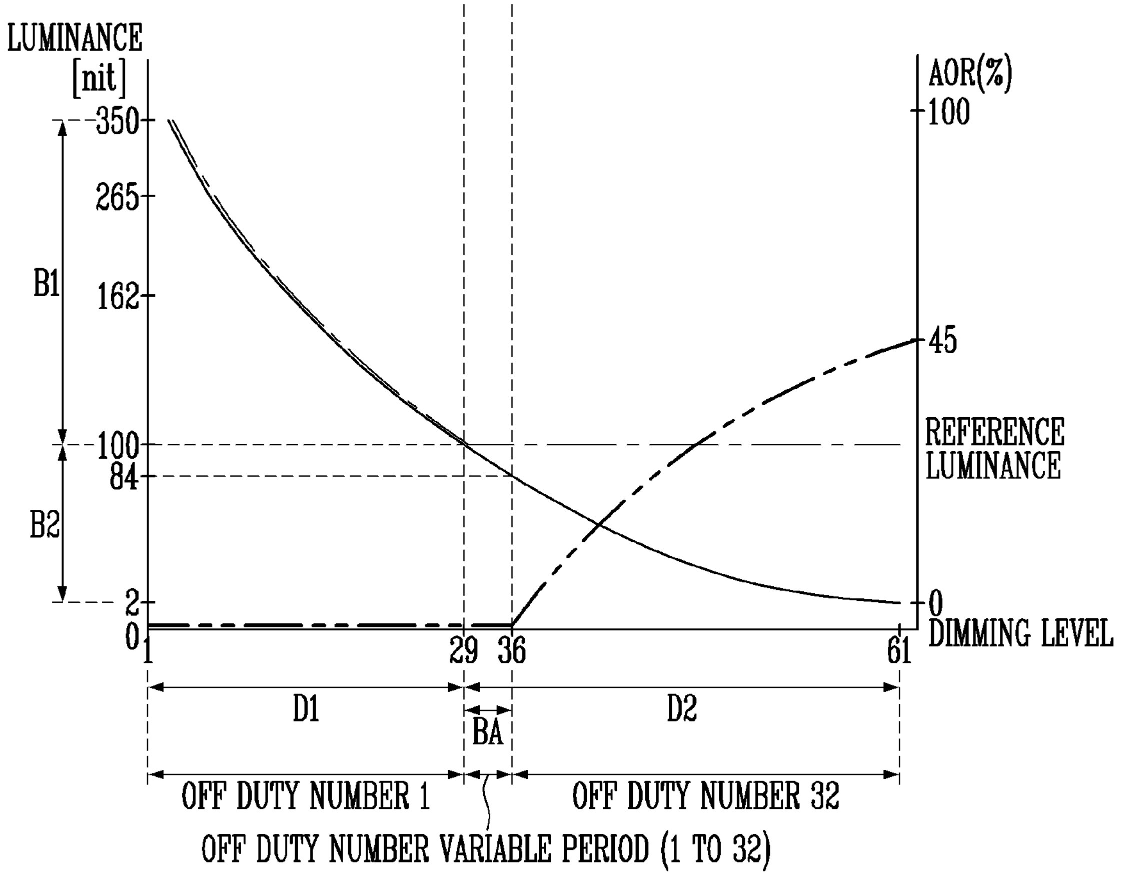
FIG. 6 is a graph illustrating a dimming method of a display device according to an embodiment.
Figure 7:
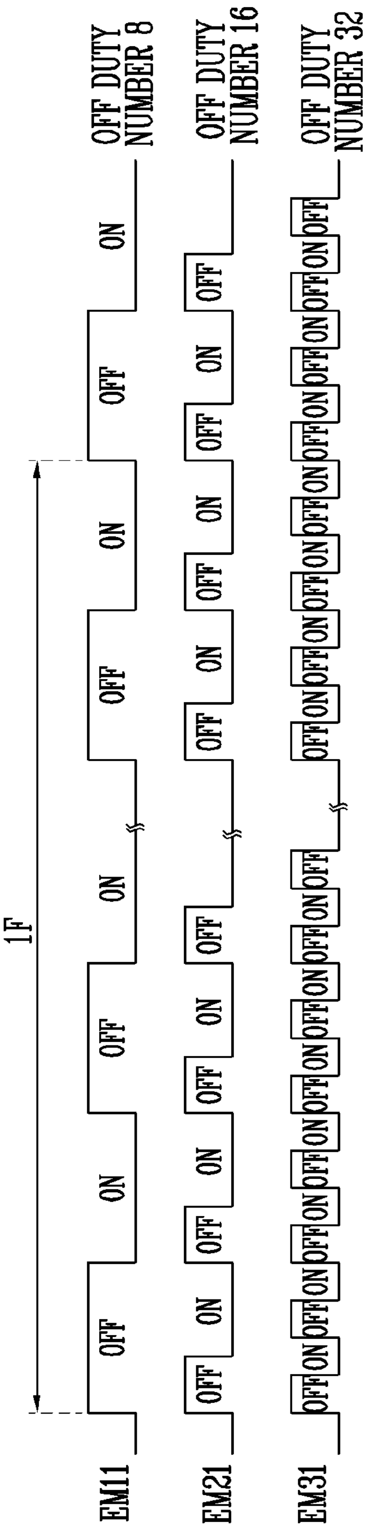
FIG. 7 is a waveform diagram illustrating a change of an off-duty number of the emission control signal of the dimming method shown in FIG. 6.
Figure 8:
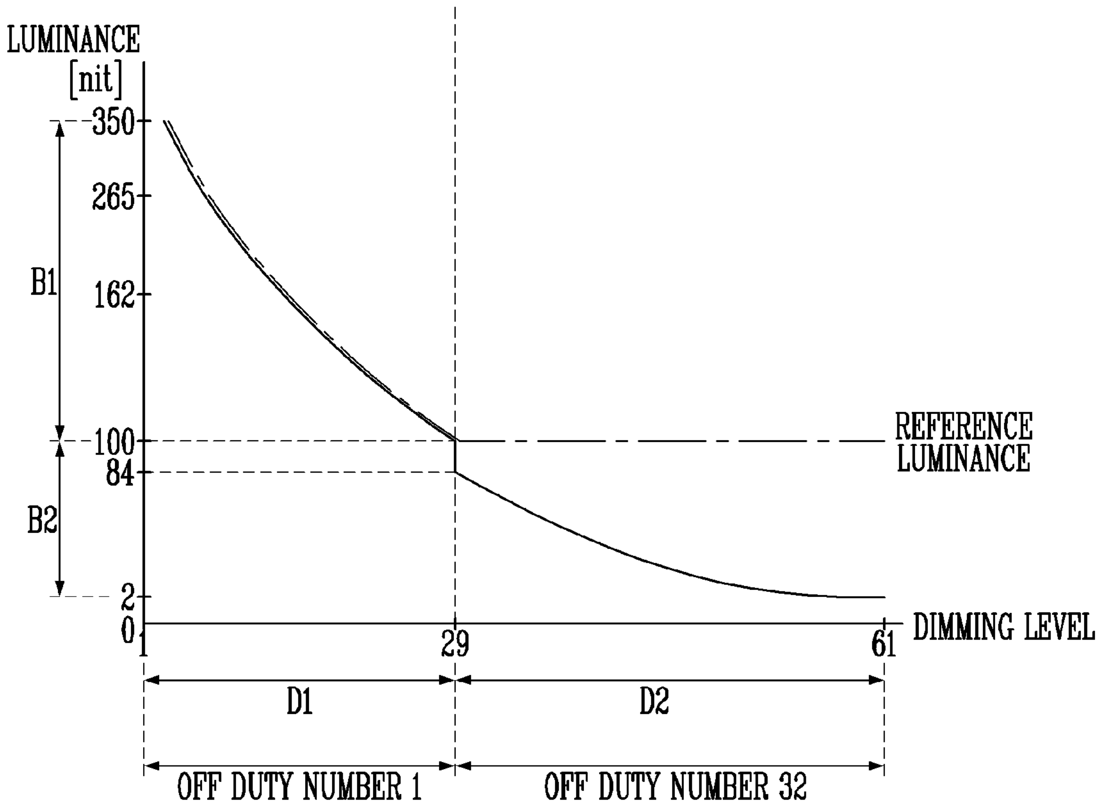
FIG. 8 is a graph illustrating a problem of a case where the off-duty number of the emission control signal included in one frame rapidly increases in a boundary area of a second dimming range and which is adjacent to a first dimming range.
Figure 9:
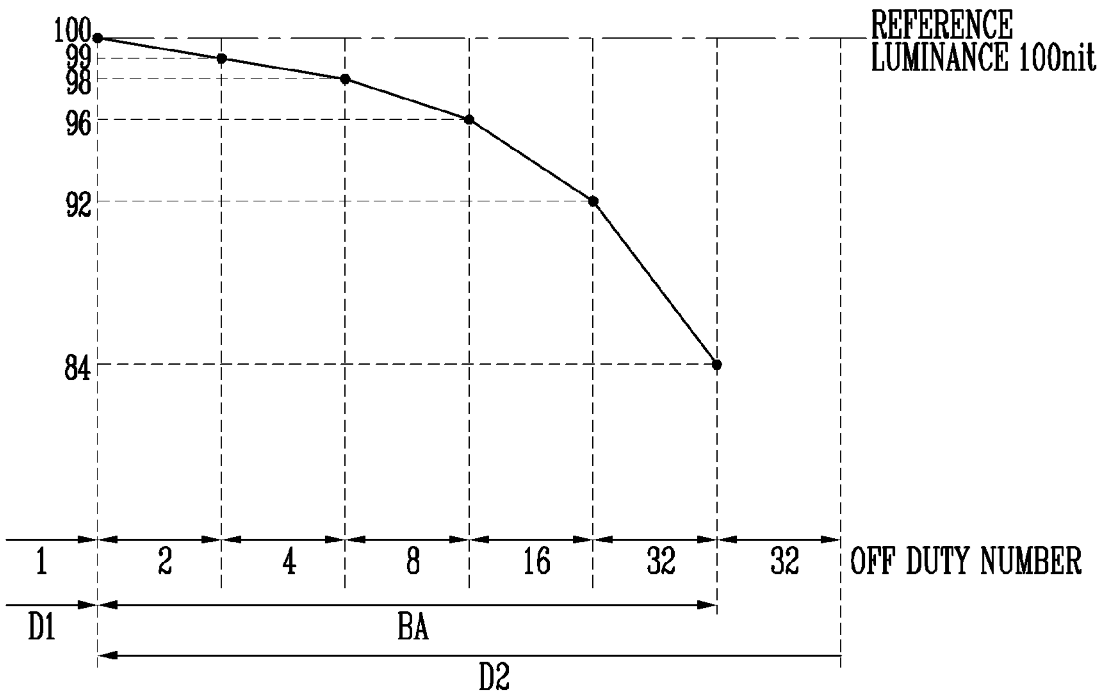
FIG. 9 is a diagram illustrating in detail a boundary area of a luminance shown in FIG. 6.

FIG. 6 is a graph illustrating a dimming method of the display device according to an embodiment. FIG. 7 is a waveform diagram illustrating a change of the off-duty number of the emission control signal of the dimming method shown in FIG. 6. FIG. 8 is a graph illustrating a problem of a case where the off-duty number of the emission control signal included in one frame rapidly increases in a boundary area of a second dimming range and which is adjacent to a first dimming range. FIG. 9 is a diagram illustrating in detail a boundary area of a luminance shown in FIG. 6. Here, a graph expressed by a solid line indicates the dimming luminance of the display device, a graph expressed by dot-dash broken lines indicates the reference luminance, and a graph expressed by dot-dot-dash broken lines indicates the AOR of the emission control signal.

Referring to FIG. 6, the luminance of the display device may increase or decrease in accordance with a dimming level (1 to 61). For example, as the dimming level increases, the luminance of the display device may non-linearly decrease. At this time, the graph expressed by the solid line indicates the dimming luminance of the display device, the graph indicated by the dot-dash broken lines indicates the reference luminance, and the graph expressed by the dot-dot-dash broken lines indicates the AOR of the emission control signal. The reference luminance may be defined as the luminance of the light emitting element LD in a case where the light emitting element LD (or the pixel PX) actually emits light according to the data signal Vdata, and the dimming luminance may be defined as the luminance of a case where the light emitting element LD emitting light with the reference luminance includes a non-emission period according to the AOR of the emission control signal. Therefore, the dimming luminance of the display device may be lower than the reference luminance by the AOR of the emission control signal.

The luminance of the display device may include at least a first luminance range B1 and a second luminance range B2. The first luminance range B1 may have a luminance higher than that of the second luminance range B2. For example, the first luminance range B1 may include an ultra-high luminance range corresponding to 350 nits to 265 nits, a high luminance range corresponding to 265 nits to 162 nits, and a medium luminance range corresponding to 162 nits to 100 nits. The second luminance range B2 may include a low luminance range corresponding to 100 nits to 2 nits. However, luminance values divided into the ultra-high luminance range, the high luminance range, the medium luminance range, and the low luminance range are exemplary, and the invention is not limited thereto.

In FIG. 6, the dimming level of the display device may be divided into 1 to 61 steps. According to an embodiment of the disclosure, a case where the dimming level is 1 to 29 may be defined as a first dimming range D1, and a case where the dimming level is 29 to 61 may be defined as a second dimming range D2. The first dimming range D1 may correspond to the first luminance range B1, and the second dimming range D2 may correspond to the second luminance range B2. However, dividing the dimming level into 1 to 61 steps is exemplary, and the invention is not limited thereto.

The first dimming range D1 may apply the smart dimming method shown in FIG. 2 or the AID method shown in FIG. 3, or may apply a combination thereof. For convenience of description, it is assumed that the first dimming range D1 applies the smart dimming method. For example, a luminance brightness step may be divided into a 10 nit-step, and smart dimming driving may be performed as a reference luminance corresponding to the luminance brightness step. In addition, in the first dimming range D1, the off-duty number of the emission control signal included in one frame may be 1.

Referring to FIGS. 3 and 7, the emission control signal EM1 shown in FIG. 3 indicates a case where the off-duty number is one. That is, the number of pulses of the emission control signal EM1 included in one frame F is 1. A (1-1)-th emission control signal EM11 shown in FIG. 7 indicates a case where the off-duty number is 8, a (2-1)-th emission control signal EM21 indicates a case where the off-duty number is 16, and a (3-1)-th emission control signal EM31 indicates a case where the off-duty number is 32. That is, the off-duty number may increase by twice in an order of the (1-1)-th emission control signal EM11, the (2-1)-th emission control signal EM21, and the (3-1)-th emission control signal EM31. For convenience of description, in FIG. 7, only cases where the off-duty numbers are 8, 16, and 32 are shown, but a case where the off-duty number is 2 means a case where the number of pulses of the emission control signal included in one frame F is two, and a case where the off-duty number is 4 means a case where the number of pulses of the emission control signal included in one frame F is 4. In another embodiment, the off-duty numbers are 2 and 4.

The second dimming range D2 may apply the AID method. For example, in the second dimming range D2, a method for maintaining the reference luminance at a constant value and adjusting the luminance by controlling the off-duty ratio AOR of the emission control signal as shown in FIG. 3 may be applied. For example, the reference luminance may be selected as any one of 110 nits to 90 nits. In FIG. 6, the reference luminance is shown as 100 nits.

In addition, in the second dimming range D2, the off-duty number of the emission control signal included in one frame (that is, the number of pulses of the emission control signal included in one frame) may be 32. In general, a human vision tends to better recognize a luminance change in a low luminance area than in a high luminance area. In the first dimming range D1 corresponding to the ultra-high luminance range, the high luminance range, and the medium luminance range, even though the number of pulses of the emission control signal included in one frame is set to 1, a user of the display device may not visually recognize a flicker phenomenon. However, in the second dimming range D2 corresponding to the low luminance range, when the number of pulses of the emission control signal included in one frame is set to 1, the flicker phenomenon may be visually recognized. In order to prevent this, it is desirable to increase the number of pulses of the emission control signal included in one frame to 32 in the second dimming range D2.

However, as shown in FIG. 8, when the number of pulses of the emission control signal included in one frame is set to 1 in the first dimming range D1 and the number of pulses of the emission control signal included in one frame is set to 32 in the second dimming range D2, a difference of numbers of pulses of the emission control signal included in one frame may rapidly increase at a point at which the dimming range is changed from the first dimming range D1 to the second dimming range D2 (that is, a point at which the dimming level is 29), and thus the luminance of the display device may momentarily largely decrease at that point. Increasing the off-duty number of the emission control signal included in one frame means that a period in which the pixel maintains a non-emission state becomes longer. Therefore, the luminance of the display device may have a large difference between the case where the off-duty number of the emission control signal included in one frame is 1 and the case where the off-duty number of the emission control signal included in one frame is 32. As a result, a problem that a flicker phenomenon occurs in the boundary area of the second dimming range D2 and which is adjacent to the first dimming range D1.

Referring to FIG. 6 again, in order to prevent such a problem, in the boundary area BA of the second dimming range D2 and which is adjacent to the first dimming range D1, the reference luminance may be maintained at a constant value, and the off-duty number of the emission control signal included in one frame may be gradually increased in an embodiment according to the invention. That is, the boundary area BA may be an off-duty number variable section (the off-duty number may be different depending on a location in the boundary area BA) of the emission control signal.

Referring to FIG. 9, the luminance controller 121 (refer to FIG. 1) according to an embodiment may gradually increase the off-duty number of the emission control signal in the boundary area BA of the second dimming range D2 and which is adjacent to the first dimming range D1. For example, the luminance controller 121 may increase the off-duty number of the emission control signal by a multiple of a specific value (e.g., 2) per frame in the boundary area BA. That is, the luminance controller 121 may increase the off-duty number of the emission control signal by twice per frame in the boundary area BA. In this case, when the off-duty number of the emission control signal is 1 at a start point (e.g., where the dimming level is 29) of the boundary area BA, the off-duty number of the emission control signal may be gradually increased as 2, 4, 8, 16, and 32 in the boundary area BA, and the off-duty number of the emission control signal may become 32 at an end point (e.g., where the dimming level is 36) of the boundary area BA. When the off-duty number of the emission control signal is 1, the luminance of the display device may be 100 nits, which is the same as the reference luminance. When the off-duty number of the emission control signal increases to 2, the luminance of the display device may converge to 99 nits. When the off-duty number of the emission control signal increases to 4, the luminance of the display device may converge to 98 nits. When the off-duty number of the emission control signal increases to 8, the luminance of the display device may converge to 96 nits. When the off-duty number of the emission control signal increases to 16, the luminance of the display device may converge to 92 nits. When the off-duty number of the emission control signal increases to 32, the luminance of the display device may converge to 84 nits.

As described above, when the boundary area BA is set as the off-duty number variable section of the emission control signal, the luminance of the display device may not rapidly decrease from 100 nits to 84 nits and may gradually decrease in an order of 100 nits, 99 nits, 98 nits, 96 nits, 92 nits and 84 nits in the boundary area BA as shown in FIG. 8. Accordingly, a luminance discontinuous section of the display device may be alleviated.

However, the method for gradually increasing the off-duty number of the emission control signal in the boundary area BA according to the invention is not limited to increasing the off-duty number of the emission control signal by twice per frame. According to another embodiment of the disclosure, the luminance controller 121 may increase the off-duty number of the emission control signal by a multiple of a specific value per frame in the boundary area BA, and when a difference of the off-duty number of the emission control signal is out of a set range, the luminance controller 121 may increase the off-duty number of the emission control signal with a more subdivided value (that is, a small value) than the specific value. For example, the luminance controller 121 may increase the off-duty number of the emission control signal by twice per frame in the boundary area BA, and when the difference of the off-duty number of the emission control signal becomes 8 or more, a section in which the off-duty number of the emission control signal is increased with a more subdivided value may be further included. That is, in a section in which the off-duty number of the emission control signal increases from 8 to 16 and a section in which the off-duty number of the emission control signal increases from 16 to 32, the luminance controller 121 may increase the off-duty number of the emission control signal by 1 per frame.

Luminance changes of the display device are 4 nits and 8 nits in the section in which the off-duty number of the emission control signal increases from 8 to 16 and the section in which the off-duty number of the emission control signal increases from 16 to 32, respectively. The luminance changes of the display device are 1 nit, 1 nit, and 2 nits in the section in which the off-duty number of the emission control signal increases from 1 to 2, the section in which the off-duty number of the emission control signal increases from 2 to 4, and the section in which the off-duty number of the emission control signal increases from 4 to 8, respectively. In the section in which the off-duty number of the emission control signal increases from 8 to 16 and the section in which the off-duty number of the emission control signal increases from 16 to 32, when the luminance controller 121 increases the off-duty number of the emission control signal by 1 per frame, an effect in which the luminance discontinuous change is alleviated in a section in which the luminance change relatively largely occurs may be expected.

Referring to FIG. 6 again, in the second dimming range D2 except for the boundary area BA, the off-duty number of the emission control signal may be maintained as the off-duty number of the emission control signal at the end point of the boundary area BA. According to an embodiment, the off-duty number of emission control signal may be maintained at 32. Therefore, a luminance adjustment of the display device in the second dimming range D2 after the boundary area BA may be performed by adjusting the AOR of the emission control signal. For example, in the second dimming range D2, as the reference luminance is maintained at 100 nits and the AOR of the emission control signal is gradually increased from 0% to 45%, the luminance of the display device may be gradually decreased from 84 nits to 2 nits.

Hereinafter, other embodiments are described. In the following embodiment, a description of the same component as that of the previously described embodiment is omitted or simplified, and a difference is mainly described.

Figure 10:
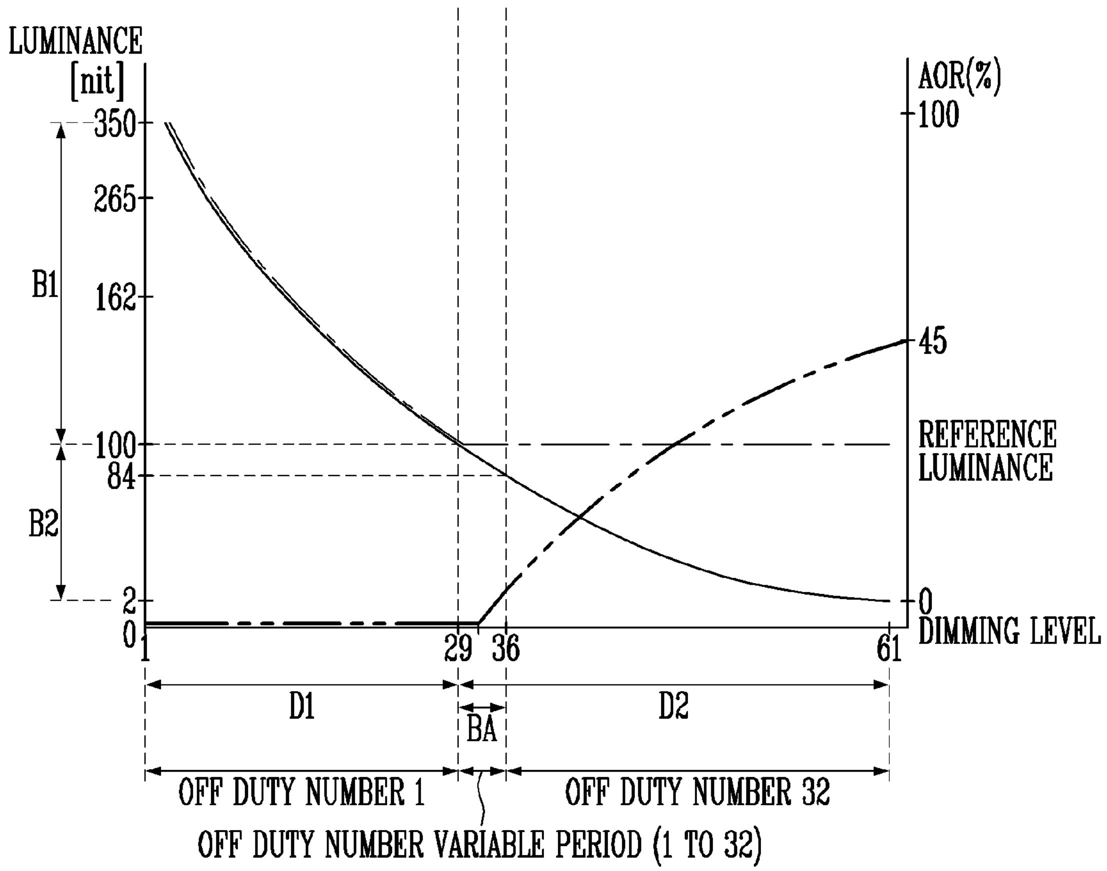
FIG. 10 is a graph illustrating the dimming method of the display device according to another embodiment.
Figure 11:
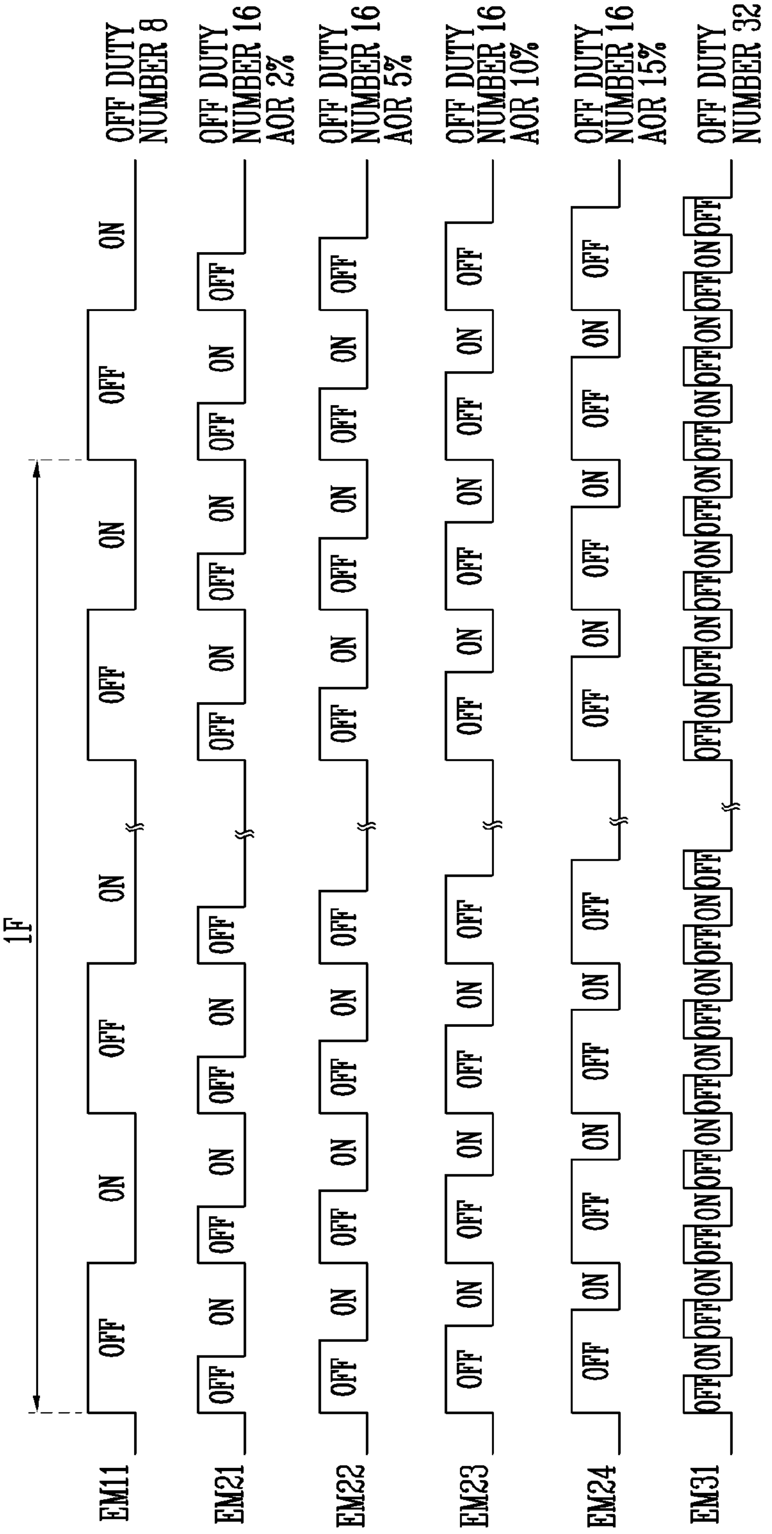
FIG. 11 is a diagram illustrating in detail a boundary area of a luminance shown in FIG. 10.
Figure 12:
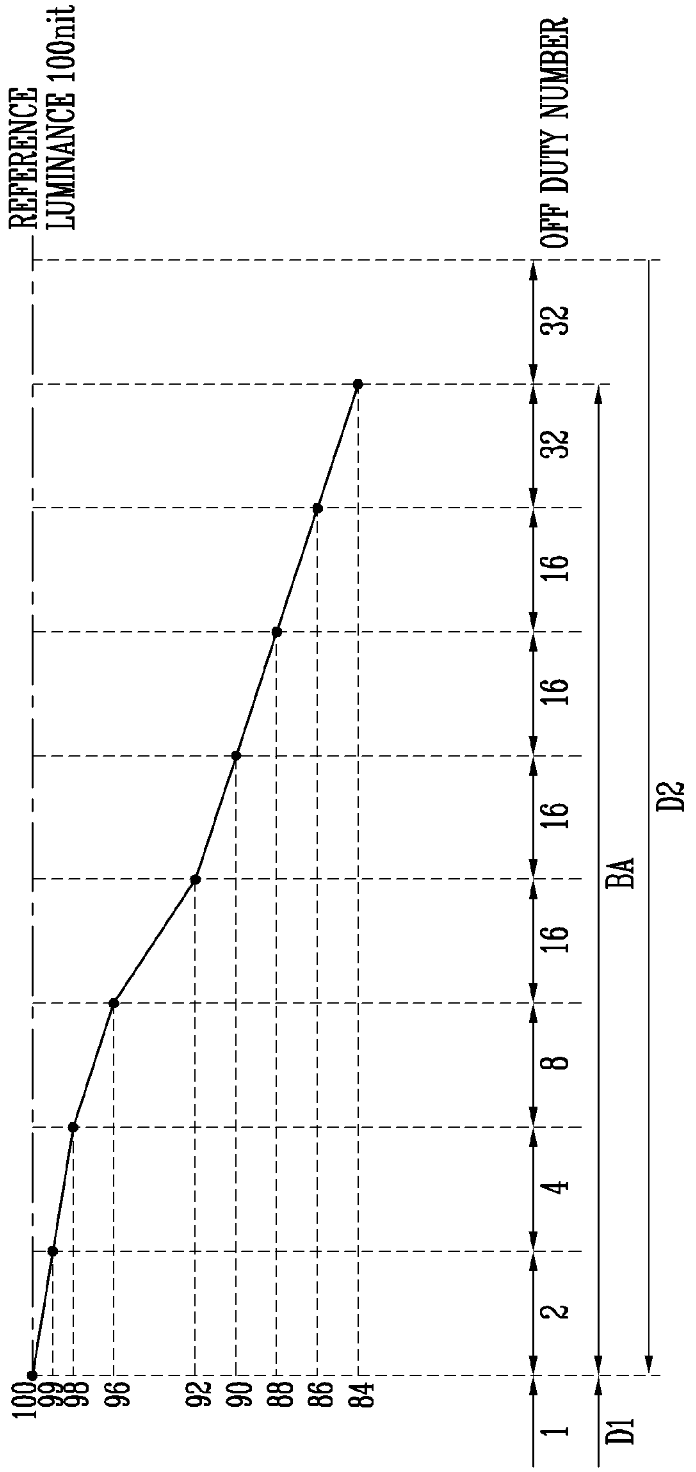
FIG. 12 is a waveform diagram illustrating the off-duty number of the emission control signal of the dimming method shown in FIG. 10 and a change of the AOR.

FIG. 10 is a graph illustrating the dimming method of the display device according to another embodiment. FIG. 11 is a diagram illustrating in detail a boundary area of a luminance shown in FIG. 10. FIG. 12 is a waveform diagram illustrating the off-duty number of the emission control signal of the dimming method shown in FIG. 10 and a change of the AOR. Here, a graph expressed by a solid line indicates the dimming luminance of the display device, a graph expressed by dot-dash broken lines indicates the reference luminance, and a graph expressed by dot-dot-dash broken lines indicates the AOR of the emission control signal.

Referring to FIG. 10, the dimming method shown in FIG. 10 is different from the dimming method shown in FIG. 6 in which the AOR of the emission control signal is maintained constantly in all areas of the boundary area BA, in that the AOR of the emission control signal is changed in at least one area of the boundary area BA of the second dimming range D2 and which is adjacent to the first dimming range D1.

Specifically, in the boundary area BA of the second dimming range D2 and which is adjacent to the first dimming range D1, the reference luminance may be maintained at a constant value, and the off-duty number of the emission control signal included in one frame may be gradually increased. The AOR of the emission control signal may be gradually increased in at least one area of the boundary area BA.

Referring to FIG. 11, the luminance controller 121 (refer to FIG. 1) according to an embodiment may gradually increase the off-duty number of the emission control signal in the boundary area BA of the second dimming range D2 and which is adjacent to the first dimming range D1. For example, the luminance controller 121 may increase the off-duty number of the emission control signal by a multiple of a specific value (e.g., 2) per frame in the boundary area BA. That is, the luminance controller 121 may increase the off-duty number of the emission control signal by twice per frame in the boundary area BA. At this time, when the off-duty number of the emission control signal is 1 at a start point of the boundary area BA, the off-duty number of the emission control signal may be gradually increased as 2, 4, 8, 16, and 32 in the boundary area BA, and the off-duty number of the emission control signal may be 32 at an end point of the boundary area BA.

The luminance controller 121 may increase the off-duty number of the emission control signal by a multiple of a specific value per frame in the boundary area BA, and when a difference of the off-duty numbers of the emission control signal is out of a set range, the luminance controller 121 may further include a section for gradually increasing the AOR of the emission control signal. For example, the luminance controller 121 may increase the off-duty number of the emission control signal by twice per frame in the boundary area BA, and when the difference of the off-duty numbers of the emission control signal becomes 8 or more, that is, in a section in which the off-duty number of the emission control signal is increased from 16 to 32, the luminance controller 121 may further include a plurality of periods for increasing the AOR of the emission control signal in an order of 2%, 5%, 10%, and 15%.

Referring to FIGS. 11 and 12, the off-duty number of a (1-1)-th emission control signal EM11 may be 8. The off-duty number of a (2-1)-th emission control signal EM21 may be 16 and the AOR of the (2-1)-th emission control signal EM21 may be 2%. The off-duty number of a (2-2)-th emission control signal EM22 may be 16 and the AOR of the (2-2)-th emission control signal EM22 may be 5%. The off-duty number of a (2-3)-th emission control signal EM23 may be 16 and the AOR of the (2-3)-th emission control signal EM23 may be 10%. The off-duty number of a (2-4)-th emission control signal EM24 may be 16 and the AOR of the (2-4)-th emission control signal EM24 may be 15%. The off-duty number of a (3-1)-th emission control signal EM31 may be 32.

At this time, the luminance of the display device corresponding to the (1-1)-th emission control signal EM11 may converge to 96 nits. The luminance of the display device corresponding to the (2-1)-th emission control signal EM21 may converge to 92 nits. The luminance of the display device corresponding to the (2-2)-th emission control signal EM22 may converge to 90 nits. The luminance of the display device corresponding to the (2-3)-th emission control signal EM23 may converge to 88 nits. The luminance of the display device corresponding to the (2-4)-th emission control signal EM24 may converge to 86 nits. The luminance of the display device corresponding to the (3-1)-th emission control signal EM31 may converge to 84 nits.

That is, in comparison with a case where a luminance difference is 8 nits when the luminance is changed from 92 nits which is the luminance corresponding to the (2-1)-th emission control signal EM21 to 84 nits which is the luminance corresponding to the (3-1)-th emission control signal EM31, directly, in a case where the (2-2)-th emission control signal EM22, the (2-3)-th emission control signal EM23, and the (2-4)-th emission control signal EM24 are further included between the (2-1)-th emission control signal EM21 and the (3-1)-th emission control signal EM31, since the luminance is gradually decreased by 2 nits, the luminance discontinuous change of the display device may be alleviated.

Figure 13:
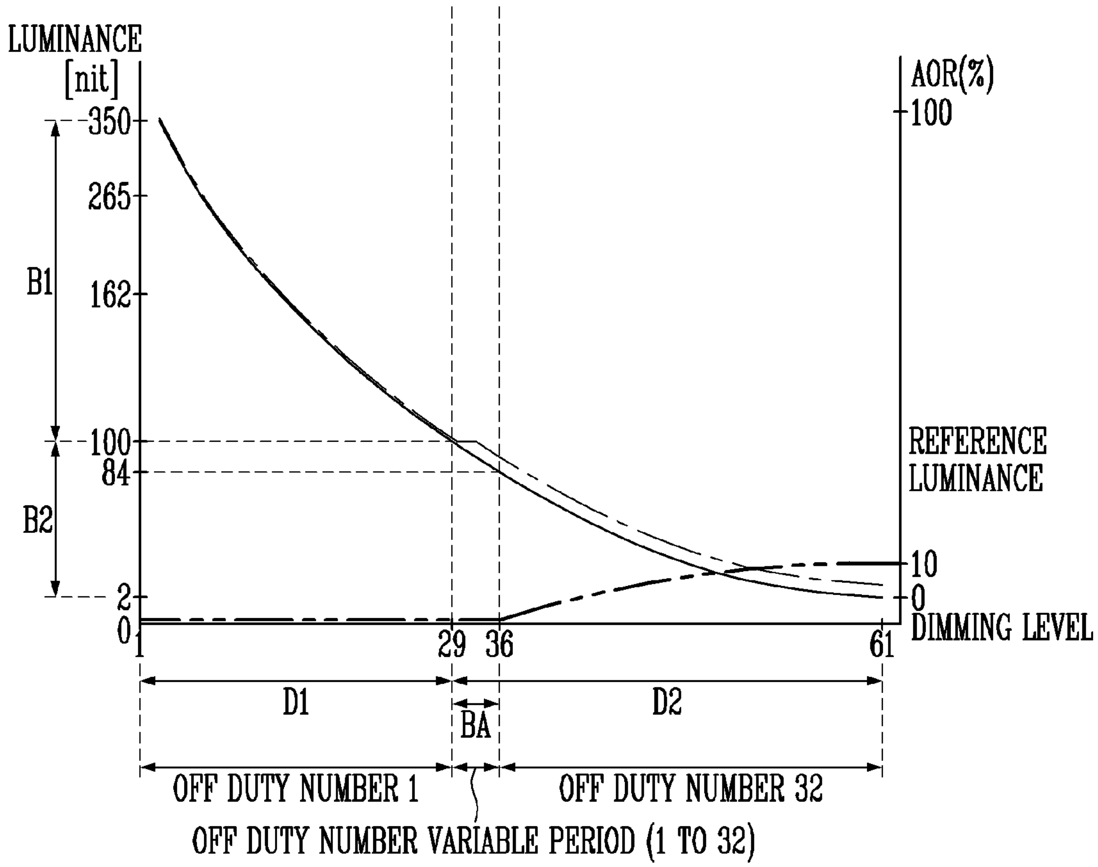
FIG. 13 is a graph illustrating the dimming method of the display device according to another embodiment.

FIG. 13 is a graph illustrating the dimming method of the display device according to another embodiment. At this time, a graph expressed by a solid line indicates the dimming luminance of the display device, a graph expressed by dot-dash broken lines indicates the reference luminance, and a graph expressed by dot-dot-dash broken lines indicates the AOR of the emission control signal.

Referring to FIG. 13, the dimming method shown in FIG. 13 is different from the dimming method shown in FIG. 6 in which the reference luminance is constantly maintained in the boundary area BA, in that the reference luminance is changed in at least one sub-area of the boundary area BA of the second dimming range D2 and which is adjacent to the first dimming range D1.

Specifically, the luminance controller 121 (refer to FIG. 1) may gradually increase the off-duty number of the emission control signal included in one frame in the boundary area BA of the second dimming range D2 and which is adjacent to the first dimming range D1, and may gradually decrease the reference number in at least one area and the remaining second dimming range D2 except for the boundary area BA.

In another embodiment, for example, the luminance controller 121 may increase the off-duty number of the emission control signal by a multiple of a specific value per frame in the boundary area BA. For an example, the luminance controller 121 may increase the off-duty number of the emission control signal by twice per frame in the boundary area BA. At this time, when the off-duty number of the emission control signal is 1 at a start point of the boundary area BA, the off-duty number of the emission control signal may be gradually increased as 2, 4, 8, 16, and 32 in the boundary area BA, and the off-duty number of the emission control signal may be 32 at an end point of the boundary area BA.

The luminance controller 121 may increase the off-duty number of the emission control signal by a multiple of a specific value per frame in the boundary area BA, and when a difference of the off-duty numbers of the emission control signal is out of a set range, the luminance controller 121 may further include a section for gradually decreasing the reference luminance maintained at a constant value in the boundary area. For example, the luminance controller 121 may increase the off-duty number of the emission control signal by twice per frame in the boundary area BA, and when the difference of the off-duty numbers of the emission control signal becomes 8 or more, that is, in a section in which the off-duty number of the emission control signal is increased from 16 to 32, the luminance controller 121 may decrease the reference luminance so as to correspond to a luminance brightness level of the display device.

The luminance controller 121 may gradually increase the AOR of the emission control signal in the second dimming range D2 except for the boundary area BA. However, since the reference luminance gradually decreases in all areas of the second dimming range D2, an increase (for example, 10%) of the AOR of the emission control signal may be decreased compared to an increase (for example, 45%) of the AOR of the emission control signal of the embodiment shown in FIG. 6. However, the disclosure according to the invention is not limited thereto, and for example, the AOR of the emission control signal may be 0% in all areas of the first dimming range D1 and the second dimming range D2 in another embodiment.

As described above, the luminance discontinuous change of the display device may be further alleviated by adjusting the reference luminance together with increasing the off-duty number of the emission control signal in the boundary area BA of the second dimming range D2 and which is adjacent to the first dimming range D1.

Figure 14:
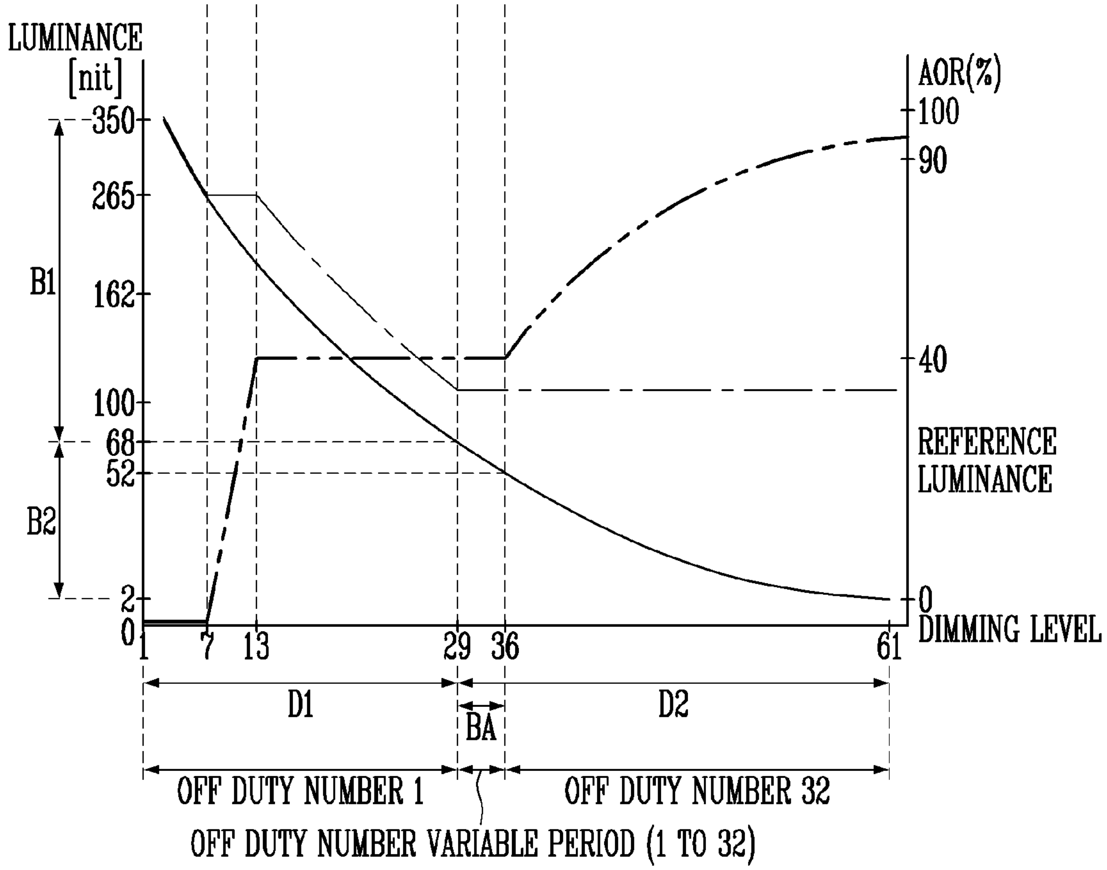
FIG. 14 is a graph illustrating a display device to which dimming methods different for each luminance area are applied.

FIG. 14 is a graph illustrating a display device to which dimming methods different for each luminance area are applied.

Referring to FIGS. 1 to 7 and 14, the luminance controller 121 according to an embodiment of the disclosure may apply the above-described smart dimming method, the AID method, and the AID method in which a configuration of gradually increasing the duty number of the emission control signal in the boundary area, or may change a dimming mode to a predetermined dimming mode by combining them.

An organic light emitting display device 100 shown in FIG. 14 is characterized in that a dimming method different for each luminance area is applied, and through this, continuous dimming implementation is possible naturally.

Specifically, in the case where the ultra-high luminance area, for example, the luminance area is 350 nits to 265 nits, the smart dimming method described with reference to FIG. 2 may be applied.

In a case of the high luminance area, for example, in a case where the luminance area is 265 nits to 162 nits, a method for setting a luminance of the highest grayscale, that is, the reference luminance is set to 265 nits to fix gamma based on this, and adjusting the luminance by controlling the AOR of the emission control signal as shown in FIG. 3 may be applied. At this time, when the luminance is 162 nits, the off-duty ratio AOR of the emission control signal may be set to 40%. That is, in the high luminance area, the reference luminance may be set to be the same, and the AOR of the emission control signal may be increased so that the luminance of the image displayed on the pixel unit 110 may be decreased.

In a case of the medium luminance area, for example, in a case where luminance area is 162 nits to 68 nits, the AOR of the emission control signal may be fixed to 40%, and the dimming driving method through the smart dimming method described with reference to FIG. 2 may be applied. However, in this case, since the AOR of the emission control signal is 40%, the luminance is lower than that of the case where the AOR is 0%. Therefore, in a case of 162 nits, in applying the dimming method shown in FIG. 2, the maximum grayscale luminance, that is, the reference luminance, may be set to 265 nits rather than 162 nits, and the reference luminance may be set to 100 nits rather than 68 nits at 68 nits. For example, the luminance of the image displayed on the pixel unit 110 may be 162 nits by setting the reference luminance to 265 nits at 162 nits and setting the AOR of the emission control signal to 40%.

In the ultra-high luminance area, the high luminance area, and the medium luminance area, the off-duty number of the emission control signal may be maintained as 1.

In a case of the boundary area BA included in the low luminance area and which is adjacent to the medium luminance area, for example, in a case where the luminance area is 68 nits to 52 nits, the luminance of the highest grayscale, that is, the reference luminance, may be set to 100 nits to fix gamma based on this, and a method for adjusting the luminance by controlling the off-duty number of the emission control signal as shown in FIG. 6 may be applied. At this time, the off-duty number of the emission control signal may be set to 1 at a start point (i.e., the point which meet the medium luminance area) of the boundary area BA and 32 at the end point of the boundary area BA.

In a case of low luminance area, for example, in a case where the luminance area is 68 nits to 2 nits, the luminance of the highest grayscale, that is, the reference luminance, may be set to 100 nits to fix gamma based on this, and a method for adjusting the luminance by controlling the AOR of the emission control signal as shown in FIG. 3 may be applied.

That is, the luminance controller 121 may divide a dimming method for each of a plurality of luminance areas (the ultra-high luminance area, the high luminance area, the medium luminance area, the boundary area, and the low luminance area) corresponding to an intensity of the luminance, and may implement a dimming method optimized according to each dimming method.

Although the disclosure has been described with reference to the embodiments thereof, it will be understood by those skilled in the art that the disclosure may be variously changed and modified without departing from the spirit and scope of the disclosure disclosed in the following claims.

What is claimed is:

1. A display device including at least a first luminance range and a second luminance range which includes a luminance different from the first luminance range, wherein an off-duty number, which is a total number of periods in which a pixel is turned off during one frame by an emission control signal, is different in a first dimming range corresponding to the first luminance range and in a second dimming range corresponding to the second luminance range, and the total number is a natural number.

2. The display device according to claim 1, wherein the off-duty number is the number of pulses of the emission control signal included in one frame.

3. The display device according to claim 1, wherein the off-duty number is greater in the second dimming range than in the first dimming range.

4. The display device according to claim 3, wherein the off-duty number is 1 per one frame in the first dimming range, and 32 per one frame in the second dimming range.

5. The display device according to claim 1, wherein in a boundary area of the second dimming range and which is adjacent to the first dimming range, the off-duty number is gradually increased.

6. The display device according to claim 5, wherein in the boundary area, a reference luminance defined as a luminance of the pixel in a case where the pixel actually emits light is maintained as a first constant luminance value.

7. The display device according to claim 6, wherein the off-duty number increases by twice per frame in the boundary area.

8. The display device according to claim 7, wherein the off-duty number is 1 at a start point of the boundary area and 32 at an end point of the boundary area.

9. The display device according to claim 7, wherein an off-duty ratio of the emission control signal is maintained at a constant value in the boundary area.

10. The display device according to claim 7, wherein in the boundary area, when a change the off-duty number is eight or more, a section in which an off-duty ratio gradually increases is included.

11. The display device according to claim 10, wherein the off-duty ratio increases in an order of about 2 percentages (%), about 5%, about 10%, and about 15% when the off-duty number is 16.

12. The display device according to claim 7, wherein in the boundary area, when a change in the off-duty number is eight or more, a section in which the off-duty number has an intermediate number is further included between a section in which the change of eight or more occurs such that the off-duty number is changed less than eight at a time.

13. The display device according to claim 12, wherein the off-duty number increases by 1 at a time in a section in which the off-duty number increases from 16 to 32.

14. The display device according to claim 6, wherein in the second dimming range except for the boundary area, the reference luminance is maintained as the first constant luminance value, and an off-duty ratio is gradually increased.

15. The display device according to claim 6, wherein the first luminance range include a luminance higher than a luminance included in the second luminance range.

16. The display device according to claim 15, wherein a dimming luminance including the first luminance range and the second luminance range non-linearly decreases from the first dimming range to the second dimming range.

17. The display device according to claim 16, wherein the first luminance range is an area corresponding to about 350 nits to about 100 nits, and the second luminance range is an area corresponding to about 100 nits to about 2 nits.

18. The display device according to claim 17, wherein in the first luminance range, the reference luminance non-linearly decreases to correspond to the dimming luminance, and an off-duty ratio maintains a constant value.

19. The display device according to claim 17, wherein the first luminance range includes an ultra-high luminance range corresponding to about 350 nits to about 265 nits, a high luminance range corresponding to about 265 nits to about 162 nits, and a medium luminance range corresponding to about 162 nits to about 100 nits.

20. The display device according to claim 19, wherein in the ultra-high luminance range, the reference luminance non-linearly decreases to correspond to the dimming luminance, and an off-duty ratio is maintained as a first off-duty ratio.

21. The display device according to claim 19, wherein in the high luminance range, the reference luminance is maintained as a second constant luminance value which is greater than the first constant luminance value, and an off-duty ratio is gradually increased.

* * * * *